United States Patent
Tawa et al.

[11] Patent Number: 6,115,349
[45] Date of Patent: Sep. 5, 2000

[54] TWO LASER SOURCE OPTICAL PICKUP WITH A PLANO-CONVEX LENS TO COMPENSATE FOR ABERRATION CAUSED BY DISCS OF DIFFERENT THICKNESSES

[75] Inventors: Fumihiro Tawa; Shinya Hasegawa, both of Kawasaki, Japan

[73] Assignee: Fujitsu Limited, Kawasaki, Japan

[21] Appl. No.: 09/329,977

[22] Filed: Jun. 10, 1999

[30] Foreign Application Priority Data

Oct. 23, 1998 [JP] Japan ................................. 10-302675

[51] Int. Cl.⁷ ............................. G11B 7/135; G11B 7/09
[52] U.S. Cl. ..................... 369/112; 369/94; 369/44.23; 369/44.37
[58] Field of Search .................................. 369/112, 102, 369/94.58, 44.23, 118, 44.37, 46, 122, 109; 359/569, 566, 571, 574, 741, 742

[56] References Cited

U.S. PATENT DOCUMENTS

| | | | |
|---|---|---|---|
| 4,334,300 | 6/1982 | Arquie et al. | 369/44.12 |
| 4,411,500 | 10/1983 | Yonezawa et al. | 359/732 |
| 4,791,625 | 12/1988 | Nakamura | 369/112 |
| 5,473,471 | 12/1995 | Yamagata et al. | 359/569 |
| 5,526,338 | 6/1996 | Hasman et al. | 369/109 |
| 5,768,221 | 6/1998 | Kasami et al. | 369/14 |
| 5,777,970 | 7/1998 | Kajiyama et al. | 369/94 |
| 5,793,734 | 8/1998 | Tsuchiya et al. | 369/112 |
| 5,864,523 | 1/1999 | Yoshizawa | 369/44.23 |
| 5,933,401 | 8/1999 | Lee et al. | 369/112 |

FOREIGN PATENT DOCUMENTS

| | | |
|---|---|---|
| 10149562 | 6/1988 | Japan . |
| 5-034642 | 2/1993 | Japan . |
| 5325247 | 12/1993 | Japan . |
| 7105566 | 4/1995 | Japan . |
| 7182690 | 7/1995 | Japan . |
| 8045105 | 2/1996 | Japan . |
| 9073655 | 3/1997 | Japan . |
| 9204683 | 8/1997 | Japan . |
| 9326132 | 12/1997 | Japan . |
| 10026726 | 1/1998 | Japan . |
| 10031841 | 2/1998 | Japan . |
| 10069675 | 3/1998 | Japan . |
| 10134400 | 5/1998 | Japan . |

*Primary Examiner*—Tan Dinh
*Assistant Examiner*—Kim-Kwok Chu
*Attorney, Agent, or Firm*—Greer, Burns & Crain, Ltd.

[57] ABSTRACT

An optical pickup includes a first and second light-emitting elements, a light separating element, and an objective lens. A collimating lens is disposed in the first optical path connecting the first light-emitting element and the light separating element, and an optical element which produces a rotationally symmetrical wavefront aberration is disposed in the second optical path connecting the second light-emitting element and the light separating element. Light is emitted from the first light-emitting element when a thinner disk is used. Light passes through the light separating element and the objective lens to the disk. Light is emitted from the second light-emitting element when a thicker disk is used. Light passes through the light separating element and the objective lens to the disk. In the latter case, the optical element produces aberration to compensate aberration caused by the objective lens so that a small clean spot can be formed.

15 Claims, 7 Drawing Sheets

TWO LASER SOURCE OPTICAL PICKUP WITH A PLANO-CONVEX LENS TO COMPENSATE FOR ABERRATION CAUSED BY DISCS OF DIFFERENT THICKNESSES

BACKGROUND OF THE INVENTION

1. Field of the Invention

The present invention relates to an optical pickup and an optical data storage apparatus.

2. Description of the Related Art

An optical recording medium such as a magneto-optic disk (MO) or a phase change disk (PD) is used for recording or reading data thereon or therefrom. Also, a read-only compact disc (CD) or laser disk (LD) or DVD-ROM or the like is used for image data or sound data. For these media, an optical data storage apparatus including an optical pickup is used. The optical pickup includes a laser as a light source, a collimating lens and an objective lens. The collimating lens converts divergent light beams emitted from the laser into parallel light beams, and the objective lens converges the collimated light to form a beam spot of small diameter at the optical disk.

For high-density data recording and reading in an optical pickup, the spot diameter of the light beam to be impinged upon the optical disk must be made as small as possible. In order to decrease the spot diameter of light beam, it is advisable to increase the numerical aperture (NA) of the objective lens or to decrease the wavelength of the light emitted from the light source. However, an increase in the numerical aperture (NA) tends to produce aberration depending on inclination of the optical disk. In view of this, it has been considered that for an optical pickup having an objective lens with a large NA, an optical disk (DVD-ROM) whose thickness between its light incidence surface and recording surface is small is more advantageous than a conventional common optical disk (CD) or magneto-optic disk (MO). A decrease in the wavelength of a light beam emitted from the light source produces aberration, depending on the kind of the optical disk.

Under these circumstances, with the improvement of an optical pickup, the types of the optical disks which can be used with an optical pickup are restricted. To this end, an optical pickup which can be used with different types of optical disks is needed.

Figure 8:
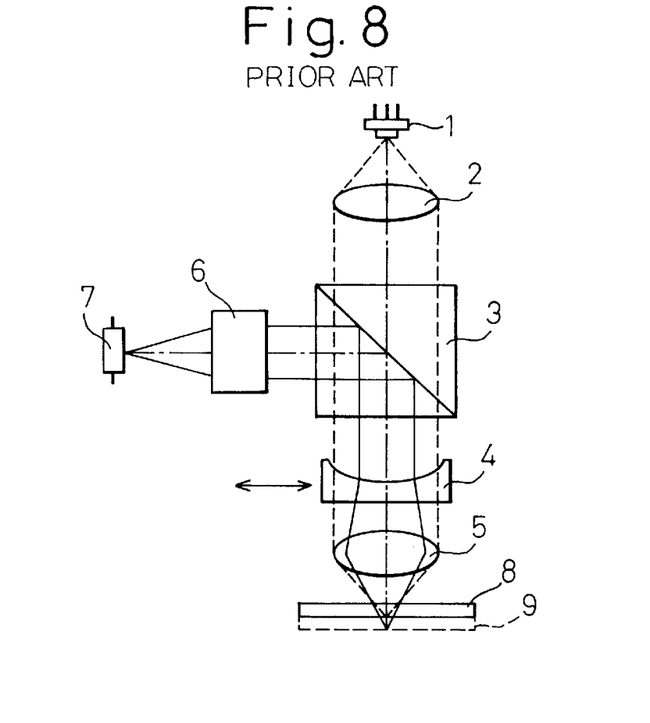
FIG. 8 is a view of a prior art pick up.

FIG. 8 in the attached drawings shows an optical pickup disclosed, for example, in Japanese Unexamined Patent Publication (Kokai) No. 7-182690. The optical pickup includes a light-emitting element (laser) 1, a collimating lens 2, a beam splitter 3 for separating light beams, an aberration correction lens 4, an objective lens 5, an optical detection system 6, and a light detector 7. In this arrangement, the aberration correction lens 4 is a concave lens which diverges light travelling toward the objective lens 5, and which increases a convergence distance of the objective lens 5. The aberration correction lens 4 can be moved in a direction indicated by arrow by means of a mechanical moving mechanism (not shown).

If a thin optical disk 8 is used, the aberration correction lens 4 is moved and retracted from the optical path. Light emitted from the light-emitting element 1 is collimated by the collimating lens 2, is transmitted through the beam splitter 3, is converged into a small spot diameter by the objective lens 5, and is made incident on the optical disk 8. The light reflected by the optical disk 8 is passed through the objective lens 5, is reflected by the beam splitter 3, and is received by the light detector 7 through the optical system 6. Thus, data recorded on the optical disk 8 is read.

If a thick optical disk 9 is used, the aberration correction lens 4 is moved into the optical path. The light emitted from the light-emitting element 1 is collimated by the collimating lens 2, is passed through the beam splitter 3 and the aberration correcting lens 4, is converged to form a small diameter spot by the objective lens 5, and is irradiated onto the optical disk 9. The light reflected by the optical disk 9 is passed through the objective lens 5 and the aberration correction lens 4, is reflected by the beam splitter 3, and enters into the light detector 7 through the optical system 6. Thus, data recorded on the optical disk 9 is read.

Figure 9:
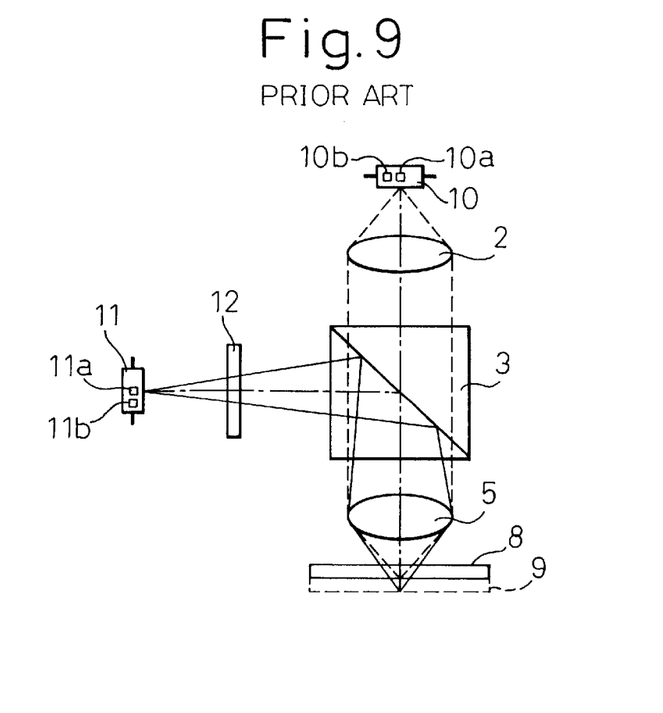
FIG. 9 is a view of a prior art pick up.

FIG. 9 in the attached drawings shows an optical pickup disclosed in Japanese Unexamined Patent Publication (Kokai) No. 9-204683. The optical pickup includes a first integrated element unit 10, a second integrated element unit 11, a collimating lens 2 disposed behind the first integrated element unit 10, an aperture restriction member 12 disposed at the rear of the second integrated element unit 11, a beam splitter 3 for separating light, and an objective lens 5. In this arrangement, the first and the second integrated element units 10 are 11 and each provided with a light-emitting element 10a or 11a and a light detecting element 10b or 11b.

Light emitted from the first light-emitting element 10a is collimated by the collimating lens 2, is passed through the beam splitter 3, is converged to form a small diameter spot by the objective lens 5, and is irradiated on the optical disk 8. The light reflected by the optical disk 8 is passed through the objective lens 5, is passed through the beam splitter 3, and impinges upon the light detecting element 10b. Thus, data recorded on the optical disk 8 is read.

Light emitted from the second light-emitting element 12 is divergent light which travels while reducing the aperture thereof by the aperture restriction member 12, is reflected by the beam splitter 3, is converged to form a small diameter spot by the objective lens 5, and is irradiated on the optical disk 9. The light reflected by the optical disk 9 is passed through the objective lens 5, is reflected by the beam splitter 3, and impinges upon the light detecting element 11b. Thus, data recorded on the optical disk 9 is read.

In the examples described above, the optical pickup has a single objective lens 5 and corrects aberration for optical disks having different thicknesses. Therefore, the optical pickup is less expensive and more useful than a solution using two different optical pickups for optical disks having different thicknesses. Nevertheless, an optical pickup having the aberration correction lens 4, as shown in FIG. 8, requires a moving mechanism for moving the aberration correction lens 4, thus leading to a large, expensive device. In an optical pickup composed of two light sources and a single objective lens as shown in FIG. 9, since divergent light is used in the optical path including the second light-emitting element 11a, the distance between lenses is strictly limited. In addition, since each beam of light emitted from the light sources is made incident upon the light separating element at different incident angles, the problem that a reflectance property or the wavefront aberration becomes worse due to the light separating element has arisen.

Figure 10:
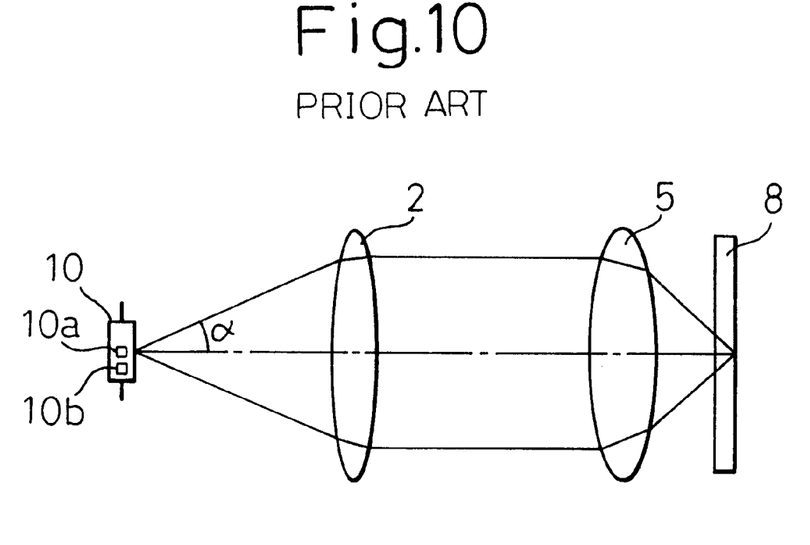
FIG. 10 is a view of a prior art.
Figure 11:
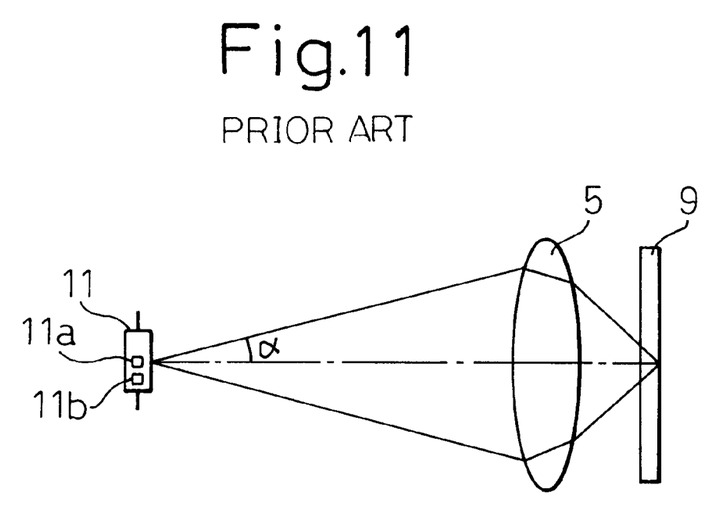
FIG. 11 is a view of a prior art.

Furthermore, the integrated element units 10, 11 shown in FIGS. 10 and 11, having light-emitting elements 10a, 11a and light detecting elements 10b and 11b incorporated therein, are available on the market. The NA(α) for the integrated elements 10 and 11 is specified to obtain an intended performance thereof. As shown in FIG. 10, if the collimating lens 2 is used, the specified NA(α) can be easily satisfied. However, as shown in FIG. 11, if divergent light is used without using the collimating lens 2, it is difficult to provide the specified NA(α).

SUMMARY OF THE INVENTION

The object of the present invention is to provide an optical pickup, and an optical data storage apparatus, which can be made compact and which can produce a small spot with reduced aberration, for optical recording media with different thicknesses between the light incident surface and the recording surface.

The present invention provides an optical pickup comprising: a first light-emitting element; a second light-emitting element; a light beam combining element disposed to receive light beams emitted from the first and second light-emitting elements, respectively; an objective lens disposed to receive respective light beams emitted from the light beam combining element; and an optical element disposed in an optical path connecting one of the first and second light-emitting elements and the light beam combining element to produce rotationally symmetrical wavefront aberration. For example, a collimating lens is disposed in a first optical path connecting the first light-emitting element and the light beam combining element, and the optical element is disposed in a second optical path connecting the second light-emitting element and the light beam combining element.

With this structure, the first light-emitting element, the collimating lens and the objective lens are constructed to be suitable for an optical recording medium of a specific thickness. The thickness refers to a thickness between a light incident surface and a recording surface. If an optical recording medium whose thickness is different from the above specific thickness is used, there is a possibility that data cannot be reproduced correctly due to aberration caused by the objective lens. The optical element which produces a rotationally symmetrical wavefront aberration produces wavefront aberration to cancel wavefront aberration produced when the objective lens is used. Therefore, if an optical recording medium whose thickness is different from the specific thickness is used, even if the objective lens constructed to be suitable for an optical recording medium of a specific thickness is used, a good spot with a small aberration can be obtained. In addition, the optical element which produces a rotationally symmetrical aberration can be made compact. According to the present invention, a moving mechanism is unnecessary and hence strict positional precision of components is not necessary.

The following features can be added to the above structure.

The first and the second light-emitting elements emit light beams having mutually different wavelengths, and the light beam separating element separates light beams having different wavelengths.

The first and the second light-emitting elements emit light beams whose polarization directions are perpendicular to each other, and the light beam separating element separates light beams of different polarizations.

The optical element which produces a rotationally symmetrical wavefront aberration converts divergent light emitted from the second light-emitting element into one of divergent light, parallel light and convergent light and emits it at a divergent angle or convergent angle below 1 degree.

The optical element which produces a rotationally symmetrical wavefront aberration is an aspherical lens, and is shaped to compensate for wavefront aberration of light condensed by the objective lens.

The optical element which produces a rotationally symmetrical wavefront aberration is a planoconvex lens having a planar portion and a spherical surface portion, and the spherical surface portion faces the second light-emitting element.

The optical element which produces a rotationally symmetrical wavefront aberration is a combined element of a collimating lens and a planar substrate which are disposed between the second light-emitting element and the light beam separating element.

The optical element which produces a rotationally symmetrical wavefront aberration is an collimating lens which is designed so that a light-emitting point of the second light-emitting element is not placed on a focal point of the collimating lens, or has a wavelength different from that of the light-emitting element.

The optical element which produces a rotationally symmetrical wavefront aberration is made of a liquid crystal.

An aperture restriction means which restricts an aperture for light beams passing through the optical element is further provided.

The optical element which produces a rotationally symmetrical wavefront aberration is held by a holder which constitutes the aperture restriction means.

The present invention further provides an optical data storage apparatus which includes the optical pickup as described above, and in which data is recorded or reproduced by irradiating the optical recording medium with light.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
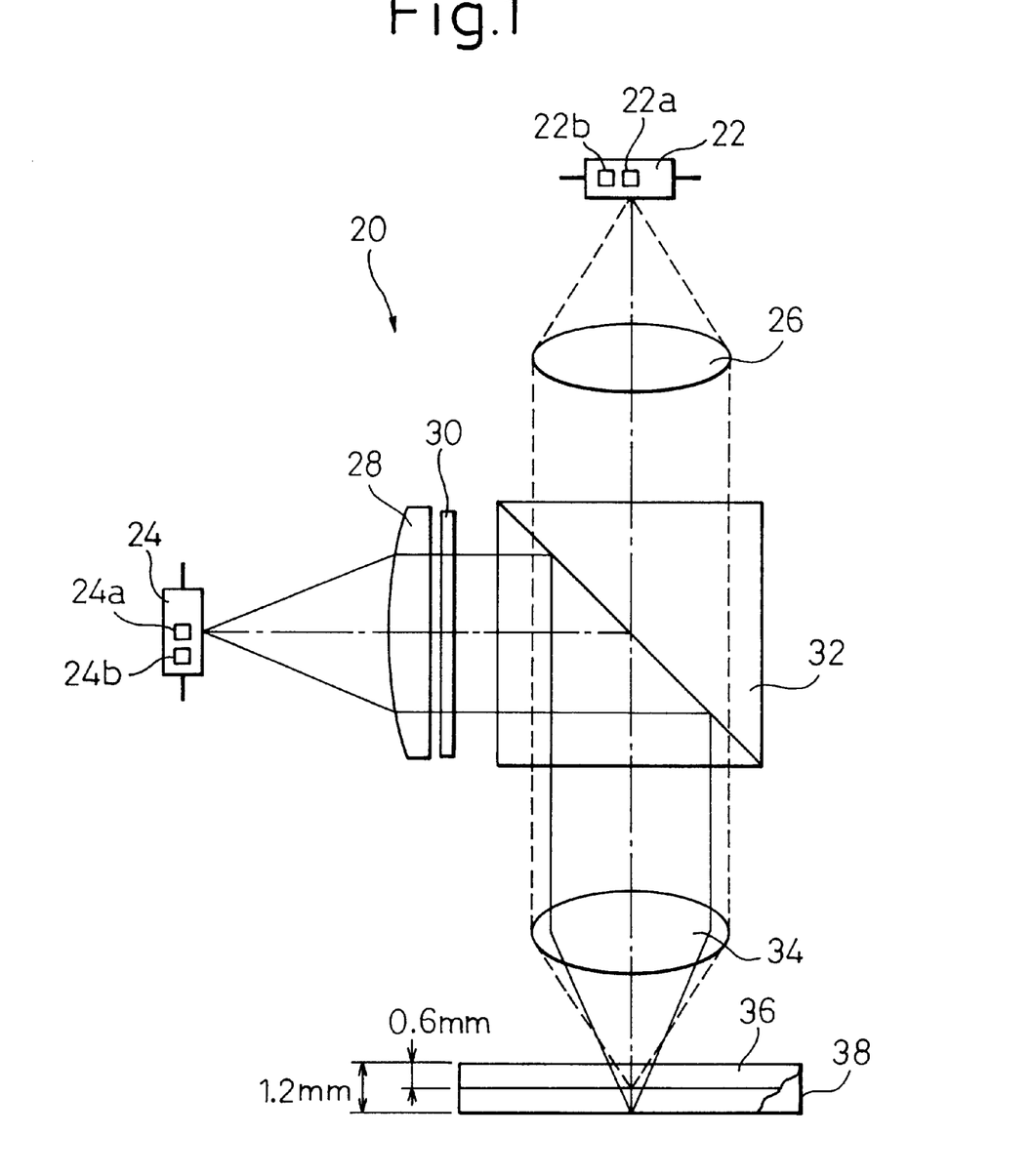
FIG. 1 is a view of an optical pickup according to the first embodiment of present invention.

FIG. 1 shows an optical pickup according to the first embodiment of the present invention. The optical pickup 20 includes a first integrated element unit 22, a second integrated element unit 24, a collimating lens 26 disposed after the first integrated element unit 22, a planoconvex lens 28 disposed behind the second integrated element unit 24, an aperture restriction member 30 disposed after the planoconvex lens 28, a beam splitter 32 for combining or separating light, and an objective lens 34.

The first integrated element unit 22 is of an integral structure including a light-emitting element (light-emitting diode) 22a and a light detecting element (photodiode) 10b. The second integrated element unit 24 is of an integral structure including a light-emitting element (light-emitting diode) 24a and a light detecting element (photodiode) 14b. The integrated element units 22 and 24 having light emitters and light detectors, integrally incorporated therein are commercially available.

The light-emitting element 22a of the first integrated element unit 22 emits a laser beam of, for example, 680 nm and is suitable for a thin optical disk (DVD-ROM) 36 having a small thickness (e.g., 0.6 mm) between a light incidence surface and a recording surface. The light-emitting element 24a of the second integrated element unit 24 emits a laser beam of, for example, 780 nm and is suitable for a thick optical disk (CD) 38 having a large thickness (e.g., 1.2 mm) between the light incidence surface and the recording surface. The thickness between the light incidence surface and the recording surface corresponds to, for example, the thickness of a substrate or that of a protective coating. If the disk has multiple recording surfaces (to which the present invention can be also applied), the thickness between the light incidence surface and the recording surface to be used varies.

The beam splitter 32 combines and splits light beams having different wavelengths. The beam splitter 32 permits the laser beam emitted from the second light-emitting element 22a to pass therethrough, and permits the laser beam emitted from the second light-emitting element 24a to be reflected. The collimating lens 26 is disposed in a first optical path which connects the first light-emitting element 22a and the beam splitter 32. The planoconvex lens 28 and the aperture restriction member 30 are disposed in a second optical path which connects the second light-emitting element 24a and the beam splitter 32. The light emitted from the first light-emitting element 22a and the light emitted from the second light-emitting element 24a are transmitted through the beam splitter 32, and thereafter, pass through the objective lens 34.

The collimating lens 26 is arranged so as to satisfy the sine condition with respect to the first light-emitting element 22a. The objective lens 34 is adapted to the optical disk 36 so that the light beam passing through the objective lens 34 forms a minimum spot diameter on the recording surface of the optical disk 36 whose thickness between the light incidence surface and the recording surface is small. Therefore, in this case, no aberration is produced in the optical disk 36. When the light beams emitted from the second light-emitting element 24a are irradiated onto the optical disk 38 whose thickness between the light incidence surface and the recording surface is large, and if there were no planoconvex lens 28, a beam spot suitable for high definition reading could not be produced because aberration of the beams would be caused on the optical disk 38. Note that the aberration is produced due to not only a difference in the thickness of the optical disk between the light incidence surface and the recording surface but also a difference in the refractive index or the wavelength thereof.

The plano-convex lens 28 is an optical lens which produces rotationally symmetrical wavefront aberration. The plano-convex lens 28 produces wavefront aberration which can cancel wavefront aberration produced when the objective lens 34 is used. Therefore, a good spot having little aberration can be obtained when the optical disk 38, whose thickness between the light incidence surface and the recording surface is different (i.e., large), is used even if the objective lens 34 is constructed to be adapted for the optical disk 36 whose thickness between the light incidence surface and the recording surface is small. The aperture restriction member 30 restricts the aperture through which the light passing through the planoconvex lens 28 is passed to form a small beam spot diameter on the optical disk 38.

In operation, if the optical disk 36 whose thickness between the light incidence surface and the recording surface is small is used, the first light-emitting element 22a is used. The light beams emitted from the first light-emitting element 22a are made parallel by the collimating lens 26, are passed through the beam splitter 32, are condensed into a small diameter spot by the objective lens 34, and thereafter, are converged onto the optical disk 36. The light reflected by the optical disk 36 is transmitted through the objective lens 34 and through the beam splitter 32, and is made incident upon the first light detecting element 22b. Thus, the data recorded on the optical disk 34 is read.

If the optical disk 38 whose thickness between the light incidence surface and the recording surface is large is used, the second light-emitting element 24a is used. The light beams emitted from the second light-emitting element 24a are passed through the plano-convex lens 28 and the aperture restriction member 30, are reflected by the beam splitter 32, are condensed into a small diameter spot by the objective lens 34, and thereafter, are impinged upon the optical disk 38. The light reflected by the optical disk 38 is passed through the objective lens 34, is reflected by the beam splitter 32, is passed through the aperture restriction member 30 and the plano-convex lens 28, and is received by the second light detecting element 24b. Thus, the data recorded on the optical disk 38 is read. For the data read by the second light detecting element 24b, it is also possible to correct aberrations.

The plano-convex lens 28 receives divergent light emitted from the second light-emitting element 34a, produces rotationally symmetrical wavefront aberration, and emits any one of divergent light, parallel light and convergent light. In FIG. 1, the light beams emitted from the planoconvex lens 28 are parallel beams. Therefore, since it is not necessary to precisely specify the distance between the planoconvex lens 28 and the objective lens 34, the planoconvex lens 28 can be placed at a fixed position.

The plano-convex lens 28 has a planar portion and a spherical portion. In the present invention, it is preferable that the spherical portion face the second light-emitting element 24a. In general use of the planoconvex lens 28, the planar portion is located on the light incidence side. However, in this arrangement, the wavefront of the light emitted therefrom approximates to a plane wavefront, and hence it is not possible to satisfactorily compensate for the wavefront aberration.

Figure 2:
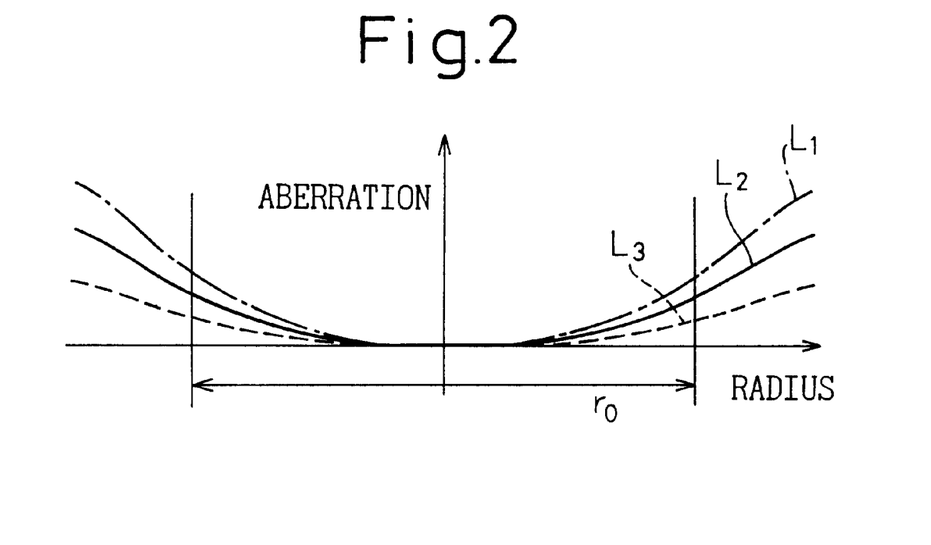
FIG. 2 is a view illustrating wavefront aberration produced by a plano-convex lens when it is arranged so that a spherical portion thereof faces a second light-emitting element.

FIG. 2 shows wavefront aberration produced by the planoconvex lens 28 when the spherical surface portion thereof faces the second light-emitting element 24a. The curve $L_1$ represents a wavefront aberration when the distance between the second light-emitting element 24a and the planoconvex lens 28 is $L_1$; the curve $L_2$ represents a wavefront aberration when the distance is $L_2$; and the curve $L_3$ represents a wavefront aberration when the distance is $L_3$.

The relationship among the three distances is $L_3 > L_2 > L_1$. As can be seen, even if the shape of the planoconvex lens 28 is identical, the wavefront aberration produced by the planoconvex lens 28 varies depending on the distance between the second light-emitting element 24a and the planoconvex lens 28. Therefore, the wavefront aberration can be controlled by controlling the distance between the second light-emitting element 24a and the planoconvex lens 28.

In an example, the wavelength of the light emitted from the first light-emitting element 22a was 680 nm, and the wavelength of the light emitted from the second light-emitting element 24a was 780 nm. The focal distance and the thickness of the spherical planoconvex lens 28 was 8 mm, and 2.5 mm, respectively. The beam splitter 32 was in the form of a cube each side of which was 6 mm to reflect light of 780 nm. The objective lens 34 was optimized so that parallel rays of light of 680 nm are converged into a suitable spot at NA 0.6 in terms of an infinite optical system on the optical disk 36 whose thickness between the incidence surface and the recording surface was 0.6 mm. The aperture restriction member 30 of the planoconvex lens 28 limits the aperture so that the light of 780 nm has NA0.5 in terms of an infinite optical system.

The spherical portion of the planoconvex lens 28 faces the second light-emitting element 24a, and the planoconvex lens 28 is disposed so that the distance between the vertex thereof and the light-emitting point is 7.65 mm. The second light-emitting element 24a and the objective lens 34, used in this example are a commercially available integrated element unit (produced by Sharp Corp.) and an objective lens (produced by Hoya Corp.), respectively. In this structure, for the optical disk 38 whose thickness between the incidence surface and the recording surface is 1.2 mm, a suitable wavefront aberration below 0.07λ can be obtained when the distance between the second light-emitting element and the objective lens 34 is in the range from 41 mm to 86 mm. Divergence angle (half angle) of the outermost ray between the planoconvex lens 28 and the objective lens 34 is 0.66°.

Figure 3:
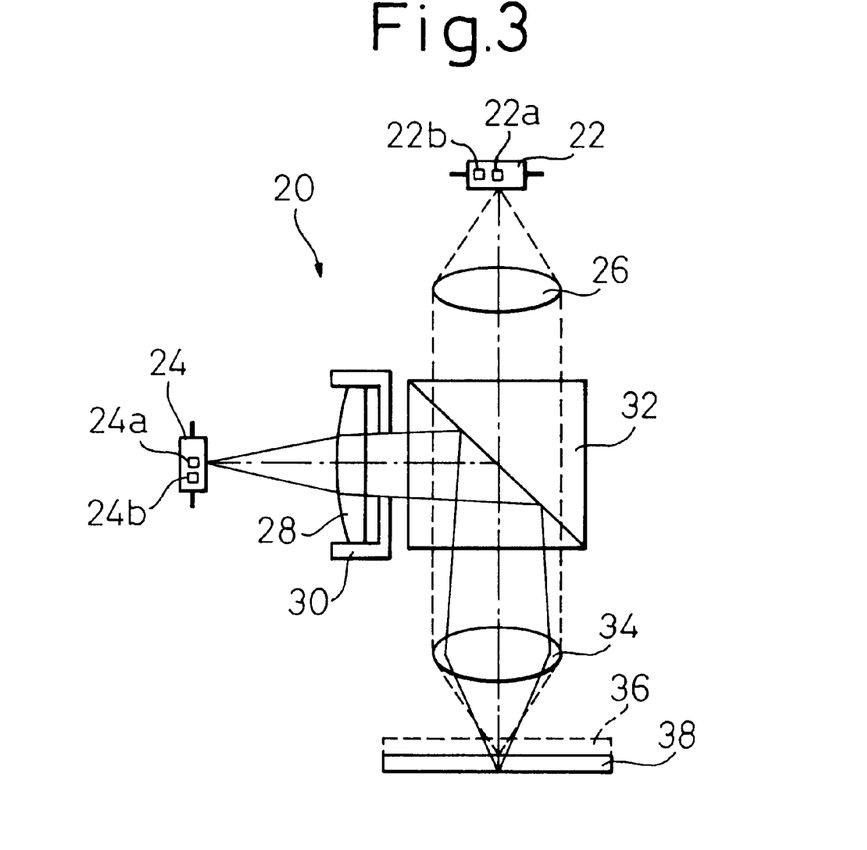
FIG. 3 is a view of an optical pickup according to the second embodiment of the present invention.

FIG. 3 shows an optical pickup according to the second embodiment of the present invention. The second embodiment includes members which are identical to those of the embodiment of FIG. 1. A difference between the second embodiment and the embodiment of FIG. 1 is that the light emitted from the planoconvex lens 28 is divergent light. The planoconvex lens 28 has a curvature of 7.56 mm and a thickness of 0.35 mm, and is disposed so that the distance between the vertex thereof and the second light-emitting element 24a is, for example, 15 mm.

Figure 4:
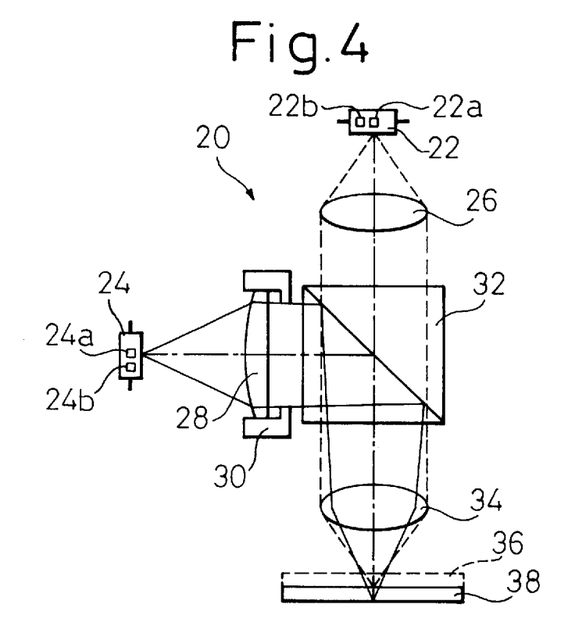
FIG. 4 is a view of an optical pickup according to the third embodiment of the present invention.

FIG. 4 shows an optical pickup according to the third embodiment of the present invention. The third embodiment includes members which are identical to those of the embodiment of FIG. 1. A difference between the third embodiment and the embodiment of FIG. 1 is that the light emitted from the plano-convex lens 28 is convergent light. The convergent light can be produced by selecting properly the curvature and thickness of the spherical surface portion of the planoconvex lens 28, and the distance from the second light-emitting element 24a.

In FIGS. 3 and 4, the aperture restriction means 30 is composed of a holder which holds the planoconvex lens 28.

Figure 5:
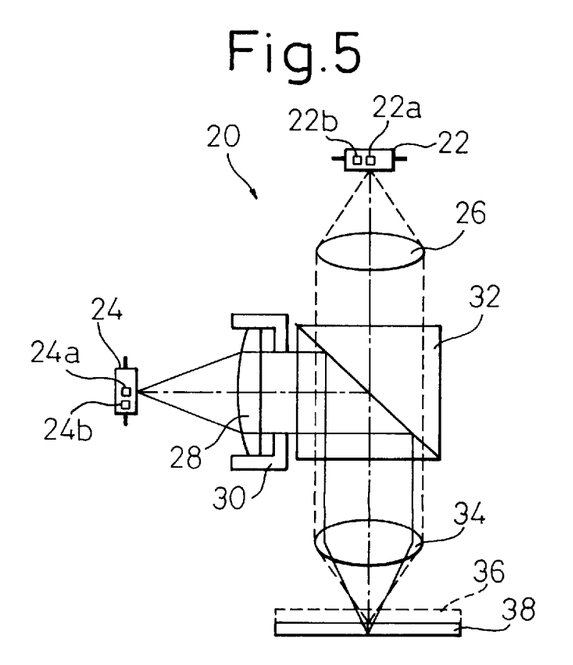
FIG. 5 is a view of an optical pickup according to the fourth embodiment of the present invention.

As shown in FIGS. 1, 3 and 5, the plano-convex lens 28 receives divergent light emitted from the second light-emitting element 34a, produces a rotationally symmetrical wavefront aberration, and emits any one of divergent light, parallel light and convergent light. In this case, it has been found that the plano-convex lens 28 can produce an aberration to compensate for the aberration produced by the objective lens 34 when the divergent angle or convergent angle is smaller than 1°. Therefore, the light emitted from the planoconvex lens 28 is parallel light, or divergent or convergent light which is almost identical to parallel light, and it is not necessary to precisely specify the distance between the planoconvex lens 28 and the objective lens 34. Thus, it is possible to place the planoconvex lens 28 in a fixed position. As can be understood form the foregoing, since the light can be optionally set to be convergent light, parallel light or divergent light, the numerical aperture (NA) on the second light-emitting element 24a to be used can be optionally set.

FIG. 5 shows a fourth embodiment of an optical pickup according to the present invention. The fourth embodiment includes members which are identical to those of the embodiment of FIG. 1. A difference between the third embodiment and the embodiment of FIG. 1 is that the wavelength of the light emitted from the first light-emitting element 22a is identical to that from the second light-emitting element 24a, and the polarization angles of the light beams emitted from the first and the second light-emitting elements 22a, 24a and incident upon the beam splitter 32 are perpendicular to each other. The beam splitter 32 is a polarizing beam splitter. In this embodiment, it is possible to reduce the wavefront aberration produced after passing the objective lens 34, for the optical disks having different thicknesses.

In the above embodiments, the planoconvex lens 28 is used as an optical element which produces a rotationally symmetrical wavefront aberration. The planoconvex lens 28 has a spherical surface portion. Instead, it is possible to use a planoconvex lens having an aspherical surface portion. Alternatively, the optical element which produces a rotationally symmetrical wavefront aberration can be made of an aspherical lens which is shaped to correct the wavefront aberration of the light condensed by the objective lens. Moreover, it is also possible to make the optical element, which produces a rotationally symmetrical wavefront aberration, of a liquid crystal.

Figure 6:
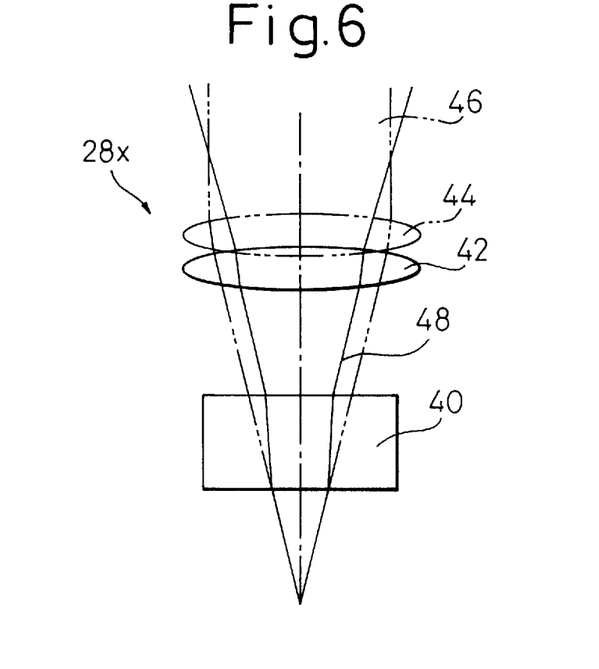
FIG. 6 is a view of a modified example of a light-emitting element which produces a rotationally symmetrical wavefront aberration.

FIG. 6 shows modified example of an optical element 28x which produces a rotationally symmetrical wavefront aberration. The optical element 28x is formed of a parallel plate 40 and a collimating lens 42 in combination, and is disposed between the second light-emitting element 34a and the beam splitter 32, in place of the planoconvex lens 28 shown in FIGS. 1, 3, and 5. In FIG. 6, 44 designates the collimating lens disposed based on the law of sines, 46 the optical path which extends through the collimating lens, and 48 the optical path which extends through the parallel plate 40 and the collimating lens 42.

Figure 7:
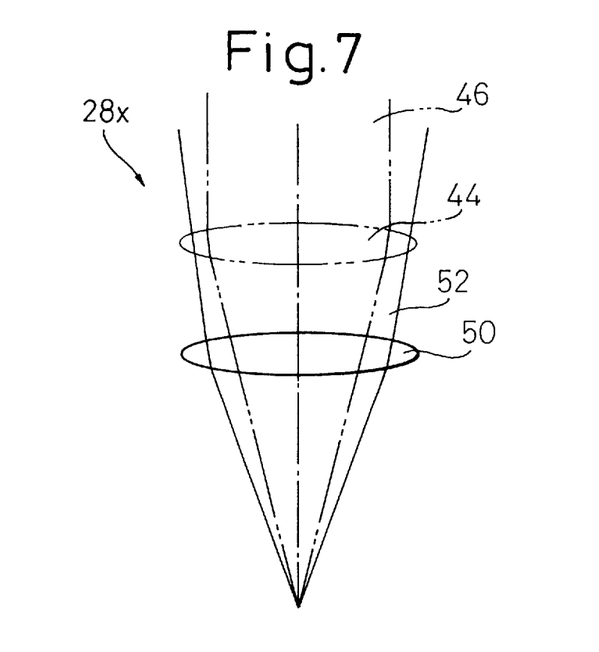
FIG. 7 is a view of another example of a light-emitting element which produces a rotationally symmetrical wavefront aberration.

FIG. 7 shows another example of an optical element 28x which produces a rotationally symmetrical wavefront aberration. The optical element 28x is made of a collimating lens 50. The collimating lens 50 is designed so that the light-emitting point of the light-emitting element 24a is not at a focal point of the collimating lens, or the wavelength thereof is different from that of the second light-emitting element 24a. The collimating lens 50 is disposed between the second light-emitting element 34a and the beam splitter 32. In FIG. 7, 44 designates the collimating lens disposed base on the law of sines, 46 the optical path which extends through the collimating lens, and 52 the optical path which extends through the collimating lens 50.

Figure 12:
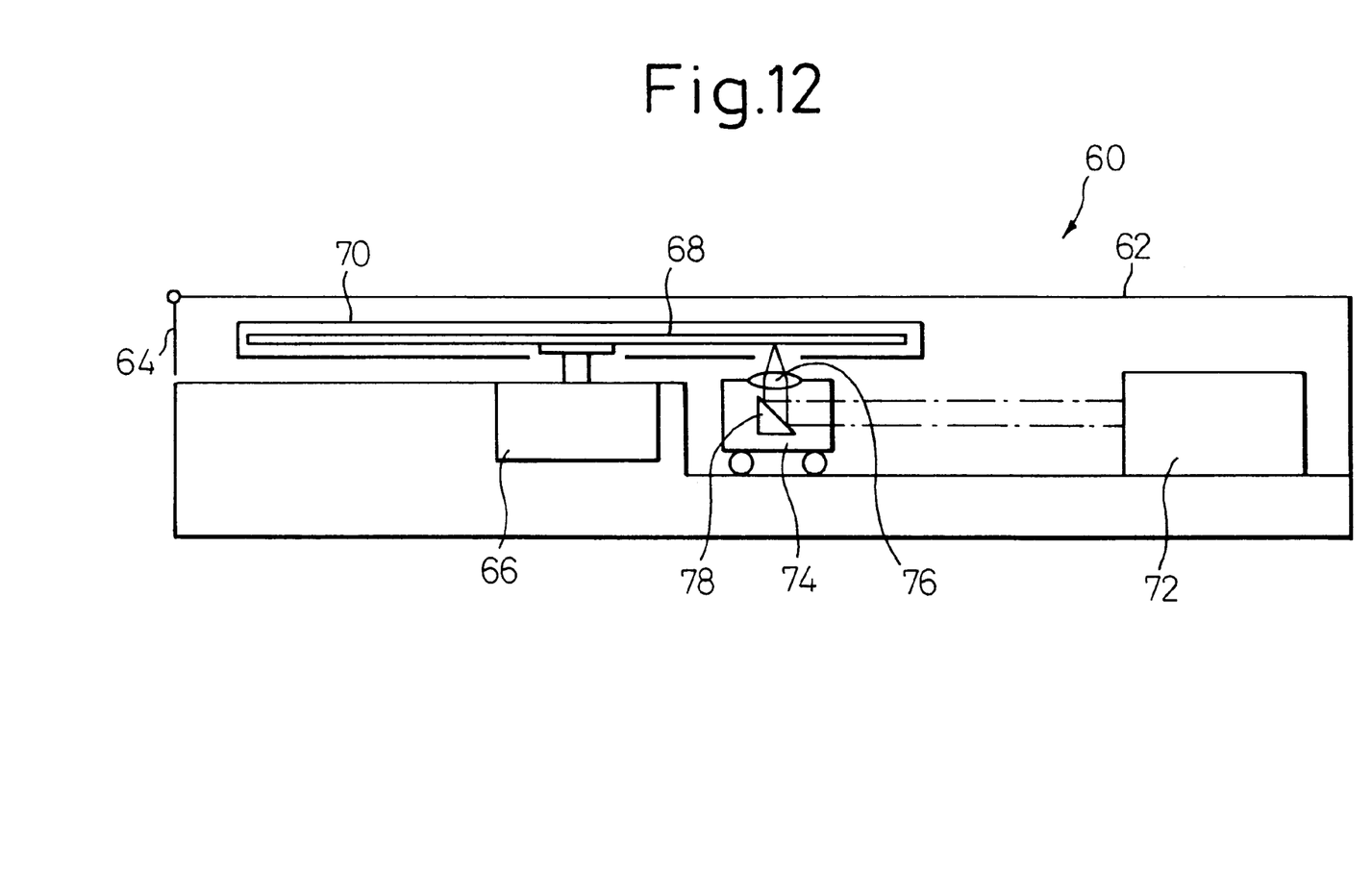
FIG. 12 is a view of an example of an optical data storage apparatus to which the present invention is applied.

FIG. 12 shows an example of an optical memory device to which the present invention is applied. In FIG. 12, an optical memory device 60 has a housing 62 which has an inlet door 64. A spindle motor 66 is provided in the housing 62, so that for example, a disk cartridge 70 including an optical recording medium can be mounted to a hub of a rotational shaft of the spindle motor 66. The disk cartridge 70 is inserted through the inlet door 64 and is loaded on the spindle motor 66. An optical system 72 and a carriage 74 are placed in the housing 62. The optical system 72 is disposed in a fixed position. The carriage 74 is movable in the radial direction of the optical recording medium 68 in the loaded disk cartridge 70 underneath the optical recording medium 68. An objective lens 76 and a mirror 78 are mounted to the carriage 74.

Optical members of the optical system 72 and the objective lens 76 correspond to the optical pickup 20 described with reference to FIGS. 1 to 7. The optical system 72 includes, for example, optical members corresponding to the first and the second optical integrated element units 22, 24 of the optical pickup 20 in FIG. 1, the collimating lens 26, the planoconvex lens 28, the aperture restriction member 30, and the beam splitter 32. The objective lens 76 corresponds to the objective lens 34 of the optical pickup 20 in FIG. 1. The mirror 78 is disposed between the objective lens 76(34) and the beam splitter 32 to bend the optical path of light beams.

When the disk cartridge 70, including the optical disk 36 in FIG. 1, is loaded as the optical recording medium 68, the first light-emitting element 22a of the first integrated element unit 22 is used, so that the light beams emitted from the first light-emitting element 22a and transmitted through the collimating lens 26 and the beam splitter 32 form a small spot on the optical disk 36 through the objective lens 76(34). When the disk cartridge 70 including the optical disk 36 in FIG. 1 is loaded as the optical recording medium 68, the second light-emitting element 24a of the second integrated element unit 24 is used, so that light beams emitted from the second light-emitting element 24a and transmitted through the planoconvex lens 28, the aperture restriction member 30 and the beam splitter 32 form a small spot on the optical disk 38 through the objective lens 76(34).

Although the above discussion has been addressed to a playback-only CD or DVD, the present invention can be applied to an optical recording medium (MO, PD, DVD-RAM or the like) in which data can be recorded by irradiation of a writing power that is stronger than a reading power.

As described above, according to the present invention, an optical pickup in which a moving mechanism is not needed, positioning precision of components is not strict, and a suitable spot having less aberration for optical disks of different thicknesses can be formed, can be obtained. In connection with an objective lens optimized to the light-emitting elements, an optical element which produces a rotationally symmetrical wavefront aberration is provided after the other light-emitting element, so that a suitable spot can be obtained for optical disks having different thicknesses or refractive indexes. Since the rays of light on the light-emitting element side on which an optical element that produces wavefront aberration is provided can be made approximately parallel, the incident angle-dependency of beam combining and separating element can be ignored. Thus, the layout of an optical system can be facilitated, and it is possible to realize a beam split type optical pickup. The NA range which can be utilized by the light-emitting element can be optionally set. Consequently, an integrated element unit which is comprised of integrated light-emitting element and light detector which has been designed for parallel rays of light, can be used. Therefore, not only a suitable spot can be obtained, but also data reading/writing precision for an optical recording medium can be improved, thus leading to an increase in the density. Moreover, the layout of an optical system can be made simple and the apparatus can be made small.

What is claimed is:

1. An optical pickup comprising:

a first light-emitting element;

a second light-emitting element;

a light beam splitting element disposed to receive light beams emitted from the first and second light-emitting elements, respectively;

an objective lens disposed to focus respective light beams emitted from the light beam splitting element;

a collimating lens disposed in a first optical path connecting the first light-emitting element and the light beam splitting element to convert light beams into parallel light beams; and a fixed optical element disposed in a second optical path connecting the second light-emitting element and the light beam splitting element to produce rotationally symmetrical wavefront aberration.

2. An optical pickup according to claim 1, further comprising an aperture restriction device which restricts an aperture for the light beams passing through the optical element.

3. An optical pickup according to claim 2, wherein the optical element producing rotationally symmetrical wavefront aberration is held by a holder which constitutes the aperture restriction means.

4. An optical pickup according to claim 1, wherein the first and the second light-emitting elements emit light beams whose polarization directions are perpendicular to each other, and the light beam splitting element separates differently polarized light beams.

5. An optical pickup according to claim 1, wherein the optical element producing rotationally symmetrical wavefront aberration converts divergent light emitted from the second light-emitting element into one of divergent light, parallel light and convergent light, and emits the light at a divergent angle or convergent angle smaller than 1 degree.

6. An optical pickup according to claim 1, wherein the optical element producing rotationally symmetrical wavefront aberration is an aspherical lens, and is shaped to compensate for wavefront aberration of the light beams condensed by the objective lens.

7. An optical pickup according to claim 1, wherein the optical element producing rotationally symmetrical wavefront aberration is a plano-convex lens having a planar portion and a spherical portion, and is arranged so that the spherical portion faces the second light-emitting element.

8. An optical pickup according to claim 1, wherein the optical element producing rotationally symmetrical wavefront aberration includes a collimating lens and a parallel plate disposed between the second light-emitting element and the light beam splitting element.

9. An optical pickup according to claim 1, wherein the optical element producing rotationally symmetrical wavefront aberration is a collimating lens, said collimating lens having a focal point different from a light-emitting point of the second light-emitting element.

10. An optical pickup according to claim 1, wherein the optical element producing rotationally symmetrical wavefront aberration is made of a liquid crystal.

11. An optical pickup according to claim 1, wherein the first and the second light-emitting elements emit light beams having mutually different wavelengths, and the light beam splitting element separates light beams having different wavelengths.

12. An optical data storage apparatus to record or reproduce data by irradiating an optical recording medium with light, said apparatus comprising:
   a first light-emitting element;
   a second light-emitting element;
   a light beam splitting element disposed to receive light beams emitted from the first and second light-emitting elements, respectively;
   an objective lens disposed to focus respective light beams from the light beam splitting element to irradiate the optical recording medium with light;
   a collimating lens disposed in a first optical path connecting the first light-emitting element and the light beam splitting element to convert light beams into parallel light beams; and
   a fixed optical element disposed in a second optical path connecting the second light-emitting element and the light beam splitting element to produce rotationally symmetrical wavefront aberration.

13. An optical data storage apparatus according to claim 13, wherein the optical element producing rotationally symmetrical wavefront aberration converts divergent light emitted from the second light-emitting element into one of divergent light, parallel light and convergent light, and emits the light at a divergent angle or convergent angle smaller than 1 degree.

14. An optical data storage apparatus according to claim 12, wherein the first and second light-emitting elements emit light beams having mutually different wavelengths, and the light beam splitting element separates light beams having different wavelengths.

15. An optical data storage apparatus according to claim 12, wherein the first and second light-emitting elements emit light beams whose polarization directions are perpendicular to each other, and the light beam splitting element separates differently polarized light beams.

* * * * *

UNITED STATES PATENT AND TRADEMARK OFFICE
CERTIFICATE OF CORRECTION

PATENT NO. : 6,115,349
DATED : September 5, 2000
INVENTOR(S) : Tawa et al.

Page 1 of 1

It is certified that error appears in the above-identified patent and that said Letters Patent is hereby corrected as shown below:

<u>Column 12:</u>
Line 4, please delete "claim 13" and insert --claim 12-- therefor.

Signed and Sealed this

Twelfth Day of June, 2001

*Attest:*

Nicholas P. Godici

NICHOLAS P. GODICI
*Attesting Officer*     *Acting Director of the United States Patent and Trademark Office*